United States Patent [19]

Nozaki

[11] Patent Number: 5,388,371
[45] Date of Patent: Feb. 14, 1995

[54] DOOR GLASS WEATHERSTRIP FOR AN AUTOMOBILE

[75] Inventor: Masahioro Nozaki, Nakashima, Japan

[73] Assignee: Toyoda Gosei Co., Ltd., Nishikasugai, Japan

[21] Appl. No.: 91,067

[22] Filed: Jul. 14, 1993

[30] Foreign Application Priority Data

Jul. 16, 1992 [JP] Japan ............... 4-055849[U]

[51] Int. Cl.6 .................. E05F 11/38; E06B 7/16
[52] U.S. Cl. .................. 49/377; 49/490.1; 49/496.1
[58] Field of Search .......... 49/377, 490.1, 440, 49/441, 496.1

[56] References Cited

U.S. PATENT DOCUMENTS

| | | |
|---|---|---|
| 2,464,406 | 3/1949 | Kramer . |
| 3,788,088 | 1/1974 | Yackiw et al. ............ 49/496.1 |
| 4,188,424 | 2/1980 | Ohno et al. . |
| 4,311,747 | 1/1982 | Kruschwitz ............ 49/490.1 X |
| 4,472,469 | 9/1984 | Thies ............ 49/490.1 X |
| 4,635,947 | 1/1987 | Hatayama ............ 49/377 X |
| 4,769,950 | 9/1988 | Ogawa et al. . |
| 4,783,931 | 11/1988 | Kirwood . |
| 4,949,507 | 8/1990 | Vaughan ............ 49/377 X |
| 5,018,308 | 5/1991 | Vaughan ............ 49/490.1 |
| 5,085,005 | 2/1992 | Yasukawa et al. . |

Primary Examiner—Philip C. Kannan
Attorney, Agent, or Firm—Cushman, Darby & Cushman

[57] ABSTRACT

A door glass weatherstrip is provided for mounting on an automobile door along a belt line thereof. The weatherstrip includes a mounting base having an insert embedded therein and a lip seal which is in pressure contact with the door glass at the distal end portion thereof. A root portion of the seal lip is provided at the lower end of the mounting base. The insert is formed at the lower end thereof with a lower end extension which extends into the root portion of the seal lip for receiving a biasing force of the door glass exerted upon the seal lip. The root portion is prevented from deforming due to biasing of the door glass. High sealing ability of the door glass weatherstrip can be maintained for an extended period of time.

3 Claims, 2 Drawing Sheets

DOOR GLASS WEATHERSTRIP FOR AN AUTOMOBILE

BACKGROUND OF THE INVENTION

The priority application No. Hei 4-055849 filed in Japan on Jul. 16, 1992 is hereby incorporated herinto by reference.

1. Field of the Invention

The present invention relates to a door glass weatherstrip which is mounted on an automobile door along a belt line thereof.

2. Description of Related Art

A door glass weatherstrip 5 (hereinafter referred simply to as "weatherstrip") is mounted on a automobile door 1 along and below line 10 thereof, as shown in FIG. 1. The weatherstrip 5 is provided in each of inner and outer sides of the door glass 2 so that the door glass 2 is sandwiched between seal lips which extend in opposing directions from the weatherstrips 5.

A typical prior art inner weatherstrip is shown in FIG. 2, which is similar to those disclosed in U.S. Pat. Nos. 5,085,005, 4,783,931, 4,769,950, 4,188,424 and 2,464,406. Seal lips 52 and 53 extend from a mounting base 51 of a weatherstrip 5B in upper and lower positions thereof, respectively. A metal plate insert 6 is embedded in the mounting base 51. The insert 6 is provided with tongue-shaped, cut protuberances 61 in appropriate positions. The mounting base 51 is secured to an interior trim 8 by inserting the cut protuberances 61 into holes 80 of the interior trim 8 and thereafter, caulking the cut protuberances 61.

When a root portion 532 of the lower seal lips 53 is provided at the lower end of the mounting base 51 as shown in FIG. 2, the root portion 532 is gradually deformed in such a manner that it is depressed downward by the biasing force of the door glass 2 acting upon the seal lip 53, as represented by a phantom line. Accordingly, the biasing force of the seal lip 53, in particular, a force at the lower seal wall thereof is decreased, resulting in reducing its sealing ability and/or causing the seal lips 53 to be entrained downward with the descending door glass.

SUMMARY OF THE INVENTION

It is therefore an object of the present invention to provide a weatherstrip in which a root portion of a seal lip is prevented from deforming while maintaining an excellent sealing ability of the seal lip.

In order to accomplish the above mentioned object of the present invention, there is provided a door glass weatherstrip mounted on an automobile door along a belt line thereof, including a mounting base having an insert embedded therein and a seal lip which is in pressure contact with the door glass at the distal end portion thereof. A root portion of the seal lip is provided at the lower end of the mounting base. The insert includes an extension at the lower end portion thereof which extends into the root portion of the seal lip for receiving a biasing force of the door glass exerted upon the seal lip.

DETAILED DESCRIPTION OF THE INVENTION

Figure 1:
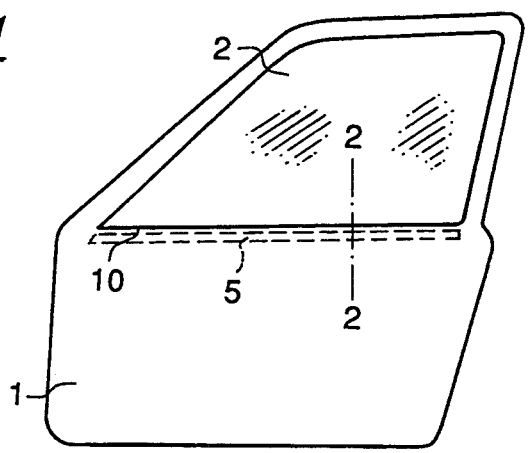
FIG. 1 is a front view showing an automobile door on which a door glass weatherstrip is mounted.
Figure 2:
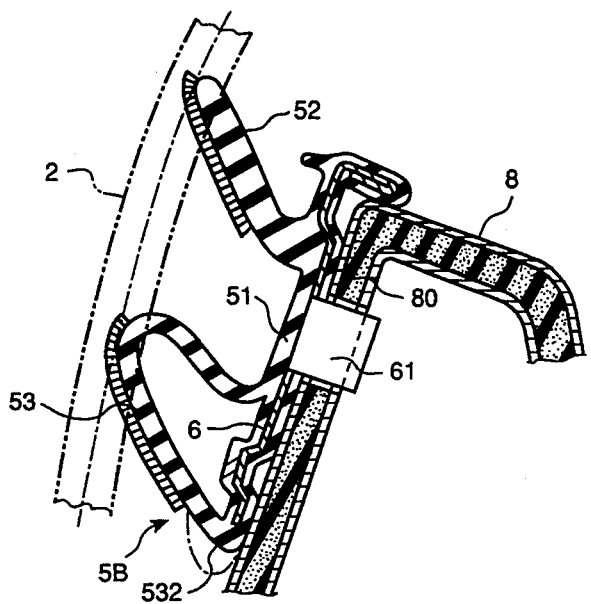
FIG. 2 is a sectional view taken along a line 2—2 in FIG. 1 showing a prior art door glass weatherstrip.
Figure 3:
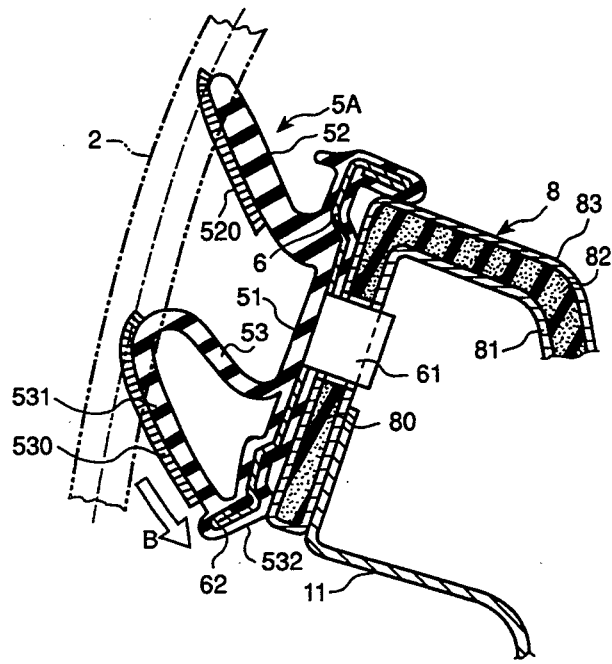
FIG. 3 is a sectional view taken along a line 2—2 in FIG. 1 showing an embodiment of a door glass weatherstrip of the present invention.

In FIG. 3, an interior trim 8 is mounted on the upper end of an inner panel 11 of an automobile door and a weatherstrip 5A is mounted upon the interior trim 8 along the belt line 10 (FIG. 1). The interior trim 8 is preferably of laminate structure comprising a base plate 81, a pad core 82 and an outermost layer 83.

The weatherstrip 5A is a molded article of rubber and comprises a mounting base 51, upper and lower seal lips 52 and 53 which extend from the upper and lower ends of the mounting base 51 obliquely in an upward direction toward the door, respectively. The distal end portions of both seal lips 52 and 53 are in pressure-contact with the inner surface of the door glass 2.

The lower seal lip 53 is hollow and has a section which is of substantially rounded, triangular shape. Both seal lips 52 and 53 are provided with flocking 520 and 530 on the lower surface thereof, respectively.

A metal plate insert 6 is embedded in the mounting base 51 over the substantially full width thereof. The insert 6 is provided with cut protuberances 61 (only one is shown in the drawing) in the intermediate position, in the width direction. The cut protuberances 61 are formed in predetermined positions along the length of the weatherstrip. The mounting base 51 is firmly secured to the interior trim 8 by inserting the cut protuberances 61 into the holes 80 of the interior trim 8 and then caulking them.

The root portion 532 of the seal lip 53 obliquely projects from the lower end of the mounting base 51 in a downward direction toward the door glass 2 and is connected with a seal wall 531 which extends in an upward and oblique direction toward the door glass. The insert 6 is formed with a folded lower end extension 62 which extends into the root portion 532 in an oblique and downward direction.

In the thus formed weatherstrip 5A, the seal lips 52 and 53 are biased inwardly by the door glass 2. When the door glass 2 is opened, a biasing force B is applied upon the lower seal wall 531 in a direction of the arrow, to deform the root portion 532.

Since the lower end extension 62 of the insert 6, which extends in a substantially normal direction to the biasing force B, is embedded in the root 532, the biasing force B is effectively received by the lower end extension 62 and the root portion 532 will not be significantly deformed. Even if the weatherstrip is used for an extended period of time, the biasing force of the seal lip 53 is maintained. The seal lip 53 is not moved in a downward direction by the descending of the door glass. Thus, sealing ability is not reduced.

Figure 4:
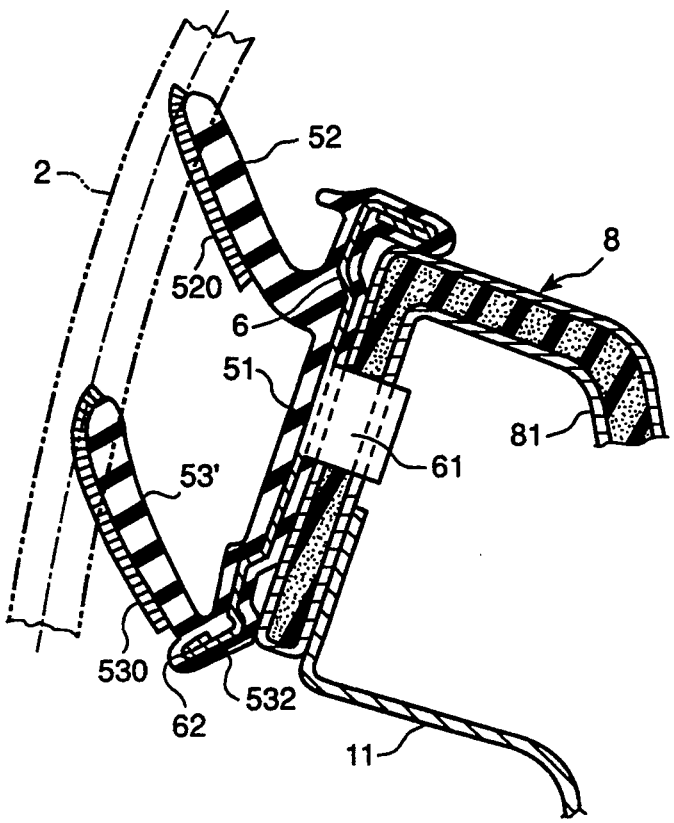
FIG. 4 is a sectional view taken along a line 2—2 in FIG. 1 showing another embodiment of a door glass weatherstrip of the present invention.

In FIG. 4, another embodiment of the weatherstrip of the present invention is shown. Since this embodiment is substantially identical to the embodiment of FIG. 3 in structure, except for the structure of the lower seal lip 53', only the different features will be described to prevent duplication of description. The lower seal lip 53' is substantially identical to the upper seal lip 52 in structure and extends linearly in an oblique and upward direction toward the door glass 2. The lower lip seal 53' preferably has a thickness which gradually decreases toward the distal end thereof.

Figure 5:
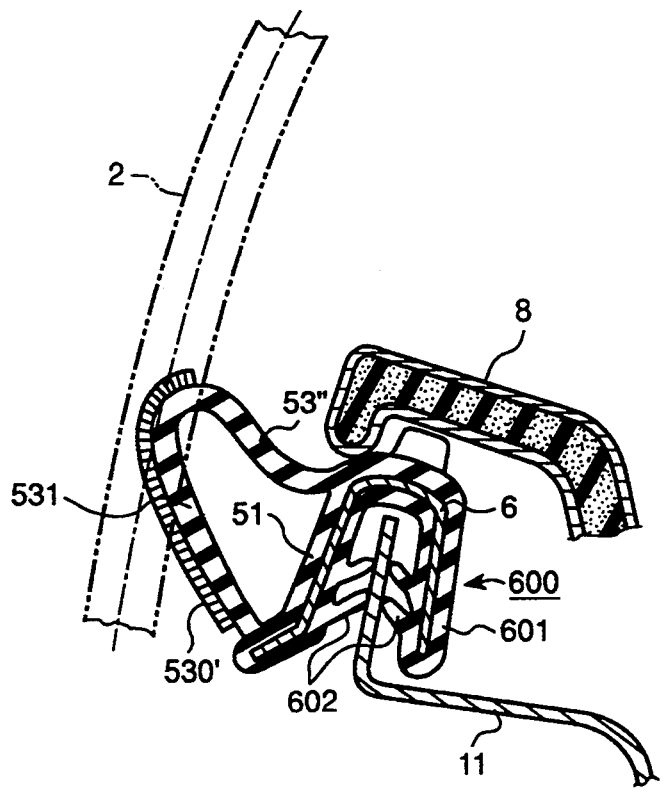
FIG. 5 is a sectional view taken along a line 2—2 in FIG. 1 showing a further embodiment of a door glass weatherstrip of the present invention.

A further embodiment is shown in FIG. 5. This embodiment is substantially identical with the embodiments of FIGS. 3 and 4 except that the pressure contact surface of the seal lip 53" is coated with urethane or fabric 530' so that the seal lip 53" will smoothly slide on the door glass 2. The mounting structure of the weatherstrip upon the door inner panel is also different from the previous embodiments. Like parts are designated with like reference numerals. The mounting structure 600 of the weatherstrip mounted on the inner panel 11 is formed as follows. An upper half of the insert 6 has a reversed U-shape form. The reversed U-shaped insert 6 is coated with a coating layer 601 which is made of the same material as the mounting base 51. A pair of detent projections 602 extend inwardly from each of the inner surfaces of coating layer 601. The inner panel 11 is inserted into the space between the detent projections of the reversed U-shaped mounting 600. The reversed U-shaped mounting 600 is engaged between an interior trim 8 and the inner panel 11.

In accordance with the present invention, deformation of the weatherstrip, in particular, of a root portion of a lower seal lip connected to a mounting base, is prevented. As a result, an excellent sealing ability is maintained for an extended period of time.

Although the present invention has been described with reference to the weatherstrip which is disposed on the inner side of the door glass, it is to be understood that the present invention is also applicable to weatherstrips which are disposed on the outer side of the door glass.

What is claimed is:

1. A door glass weatherstrip adapted to be mounted on an automobile door along a belt line thereof, the weatherstrip comprising:
    a mounting base;
    an insert embedded in the mounting base; and
    a seal lip adapted to be in pressure contact with a door glass at a distal end portion thereof, the seal lip including a root portion disposed at a lower end of the mounting base,
    said insert including an extension at a lower end portion thereof which extends to the root portion for receiving a biasing force of the door glass exerted on the seal lip, wherein said extension extends from the lower end of the insert in an oblique and downward direction towards the door glass so that it is substantially normal to the seal lip.

2. A weatherstrip as defined in claim 1, wherein said seal lip includes a lower side wall extending in an oblique and upward direction toward the door glass from the root portion thereof and an upper side wall which extends from an intermediate position of the mounting base, said seal lip being hollow in section.

3. A weatherstrip as defined in claim 2 wherein said lower side of the seal lip is coated with urethane on the door glass pressure contact surface thereof so that it smoothly slides on the door glass.

* * * * *